Patented June 29, 1943

2,323,185

UNITED STATES PATENT OFFICE 2,323,185

RUBBER HYDROHALIDE

Troy M. Andrews and Howard F. Reeves, Jr., Weeks, La., assignors to Bay Chemical Company, Inc., New Orleans, La., a corporation of Louisiana No Drawing. Application May 24, 1940,
Serial No. 337,076

14 Claims. (Cl. 260—771)

This invention pertains to improvements in rubber compositions and particularly to improvements in rubber hydrohalides, and to processes of producing compositions of rubber hydrohalide.

It is known that rubber may be caused to react with various halogen reagents. One type of such reaction comprises addition of hydrogen and halogen to the rubber molecule to form a rubber hydrohalide as by means of hydrogen chloride. This is distinguished from treatment with chlorine in which only halogen is added to the rubber molecule. The hydrohalide products vary in physical and in chemical properties but, generally speaking, are plastics similar to rubber.

For nearly half a century this type of chemical alteration of rubber has been known in the laboratory, and more recently has been studied for practical, industrial application. Many uses for rubber hydrohalide products would result if cost of production could be cheapened sufficiently and if quality of product could be controlled adequately. Though such modified rubruber compositions may be used alone, they would not necessarily supplant rubber but may serve for intermixture with rubber and with other plastic compositions.

Rubber hydrohalide compositions may be useful as films or sheets for wrapping, or as seals, or as coating compounds and for water-proofing products. These uses are similar to those of Cellophane, cellulose acetate and similar materials. Rubber hydrochloride has many advantages over these products, especially in water-proofness, in toughness, and in flexibility.

Rubber for treatment with hydrogen chloride usually has been dissolved in such a solvent as chloroform, benzene or petroleum distillate. The rubber solvent sometimes has been retained tenaciously in the final product, and has entailed considerable apparatus and expense to recover. Moreover, when the solvent was recovered by distillation from the product, undesirable impurities remained in the product, such as proteins, sugars, resins, and the like. In some cases, the removal of solvents has left the rubber hydrohalide in undesirable physical condition.

Proposals have been made to treat rubber with hydrogen chloride under pressure or even in liquid condition. Where the reagent is applied to solid rubber, reaction is not uniform and may produce a higher degree of conversion on the outer surface than within the solid.

Even introducing the reagent into solutions of rubber is difficult because the solution becomes very viscous. Solutions based on about 6% rubber have been indicated to be extremely viscous.

In brief, disadvantages of previous attempts to manufacture rubber hydrohalide comprise high costs of pretreating or of after-treating to obtain a relatively pure product; expensive equipment where pressure or liquid reagent is involved; high costs and relatively large quantities of solvents and of precipitating agents; expense of handling and recovering considerable amounts of liquid; undesirable forms of product such as lumps or spongy granules or gelled masses that are difficult to free from residual solvent or to dry or to redissolve; considerable time required for reaction, often fifteen to twenty hours; difficulty of controlling the composition of the product because of precipitation automatically at certain critical stages of reaction; and highly viscous solutions which minimize the concentration of rubber for reaction and render difficult efficient application of reagent hydrohalide.

The present invention makes available various benefits by reacting dissolved rubber with hydrogen halide in the presence of a fluidity agent of good solubility for the hydrogen halide reagent. Moreover, the solvent preferably contains some proportion of precipitant for rubber hydrohalide, but so limited as to be insufficient to precipitate the rubber hydrohalide even at completion of the reaction.

Illustrative examples to clarify the purposes and principles of this invention will be understood not to be restrictive, for the invention may be practiced in various other modifications. In this description, it will be convenient to refer to hydrogen chloride, but it is understood that hydrogen bromide and hydrogen iodide are regarded also as suitable hydrohalide reagents. Illustrative examples, further, designate benzene as rubber solvent, solvent naphtha as rubber hydrohalide precipitant, and n-butyl alcohol as fluidity agent. Mixture of benzene and solvent naphtha also dissolves rubber.

From such mixed liquids, the resulting composition is useful of itself. Moreover, the rubber hydrohalide produced is in such form as to be readily susceptible of additional reaction with hydrogen chloride. The extent of reaction and the form of the product may be controlled and also the arrangement of processes suitable for inexpensive, commercial operation.

Example I

In this example, the entire product is kept in solution until completion of the reaction; no precipitant of the product is present during reaction. A fluidity agent is used that is of good solvent power for hydrogen chloride and that may be recovered.

100 parts by weight of crepe rubber, preferably in small pieces, is agitated with 80 parts by weight of n-butyl alcohol and 820 parts by weight of benzene. The solution thus contains 10% rubber for treatment. This composition on agitation for fifteen to thirty minutes becomes a homogenous fluid mass. Then hydrogen chloride is introduced for reaction at such a rate as to saturate the mixture during reaction. Meanwhile the solution is agitated and the temperature maintained at 10° to 35° C. About 20° C. is preferred. After about 2½ to 4 hours, the mixture becomes somewhat viscous. At this point, so-called solvent naphtha is added gradually with agitation until about 1900 parts by weight have been added. This addition is slow at first so that the gel produced at first absorbs the naphtha instead of becoming broken and lumpy. After early stages of adding of precipitant, or after about half the naphtha is added, the swollen gel begins to break. Then the rubber hydrochloride precipitates in small particles on addition of the remainder of the naphtha.

The mixture is neutralized by adding basic material such as soda ash, and filtering. The residue is washed with a small amount of water to remove solid products of neutralization or other water soluble materials and then is steam distilled in the presence of wetting agent to prevent agglomeration of the particles. After this distillation the product is washed with hot water and then dried.

Solvent recovered by the steam distillation is then dried and mixed with the solvent recovered by filtration. Benzene and butyl alcohol are separated from the naphtha by distillation, the naphtha remaining in the still. The water layer obtained in the steam distillation contains dissolved butyl alcohol. This can be salted out for re-use by addition of sodium chloride.

Example II

This example resembles Example I, but completes reaction with hydrogen chloride after precipitation of the partially reacted rubber.

100 parts by weight of crepe rubber is taken into solution by agitation with 820 parts by weight of benzene containing 80 parts by weight of butyl alcohol. Then hydrogen chloride is introduced at such rate as to saturate the mixture during reaction. While the gas is being added, the solution is agitated and is maintained at a temperature of 10 to 35° C., or preferably about 20° C. After two to four hours the reaction mixture becomes somewhat viscous and the rubber hydrochloride contains about 26% to 31.5% chlorine. The rubber hydrochloride then is precipitated as finely divided particles by adding 1900 parts by weights of solvent naphtha, as described in Example I.

Then hydrogen chloride is passed from two to six hours into the mixture containing the precipitate. At the end of this time the rubber is practically completely reacted and contains from 33 to 33.5% chlorine. The separation of the product and solvent recovery is the same as in Example I. This additional chlorination is optional in its extent.

Example III

This example is analogous to Example I in that reaction with hydrogen chloride is completed before rubber hydrohalide is precipitated. But during reaction the solution contains an amount of precipitant for rubber hydrochloride.

100 parts by weight of crude crepe rubber in small pieces is dissolved by agitation in 275 parts by weight of benzene, containing 37.5 parts by weight of n-butyl alcohol and 550 parts of solvent naphtha. Hydrogen chloride is passed through the solution as rapidly as it can be absorbed. During this time the solution is kept at 10 to 35° C., preferably about 20° C., and is well agitated. The mixture becomes more fluid as it becomes more acid and as the reaction proceeds during the initial stages, but after two to four hours addition of hydrogen chloride, the solution is somewhat viscous.

To this completely reacted solution now is added slowly 450 parts by weight of solvent naphtha. In consequence rubber hydrochloride precipitates readily in finely divided form. It may contain about 30% chlorine. Free acid in the supernatant solvent may be neutralized with soda ash. The liquid then is filtered from the solid rubber hydrochloride. This solid is washed on the filter with naphtha and then steam distilled to remove the small amount of residual solvent and is dried.

Example IV

In this example the reacting solution contains some amount of precipitant for rubber hydrohalide. Addition of hydrogen chloride is stopped before completion of the reaction and the reaction is completed by treating the rubber hydrohalide precipitate with hydrogen chloride.

100 parts by weight of rubber are dissolved by agitation in 275 parts by weight of benzene containing also 550 parts by weight of solvent naphtha and 37.5 parts by weight of n-butyl alcohol. Hydrogen chloride is passed into the solution as rapidly as it can be absorbed with a temperature of about 10 to 35° C., preferably about 20° C. The mixture is agitated during addition of the hydrogen chloride and becomes more fluid as the reaction proceeds, but after two to four hours of addition of hydrogen chloride the solution is somewhat viscous. Its chlorine content is about 26 to 31.5%. Then there is added 450 parts by weight of solvent naphtha of the same grade as used in preparing the rubber solution to precipitate the rubber hydrochloride in finely divided form.

Hydrogen chloride is passed for two to six hours into this mixture containing precipitated rubber hydrochloride. At the end of that time the rubber contains any desired quantity of chlorine up to 33.5%.

Example V

Well milled rubber may be treated as in Example IV at a concentration of about 24.5% by weight with 75 parts of the milled rubber dissolved in 74 parts by weight of benzene containing 146 parts by weight of naphtha and 10 parts by weight of butyl alcohol. Hydrogen chloride is passed into the solution as fast as it can be absorbed at 10 to 35° C. with agitation two to four hours. Then 180 parts of solvent naphtha are added to precipitate the hydrochloride in finely divided form. Hydrogen chloride may be passed into this precipitate mixture for two to six hours for any desired hydrochloridization.

The solvents may be recovered and re-used as indicated in the previous examples. It will be observed that such rubber solvent for re-use requires distilling only butyl alcohol and benzene. These liquids are in lesser proportion than the naphtha that remains in the still. Consequently, distillation costs are a minimum. The naphtha can be re-used several times before requiring purification.

It will be observed from Examples I and II, in which no non-solvent for rubber hydrochloride is present during reaction in solution, that 100 parts of rubber required for treatment 820 parts of benzene and 1900 parts of naphtha, a total of 2720 parts. But in Examples III and IV in which some amount of non-solvent for rubber hydrochloride was present during reaction in solution only 275 parts of benzene and 1000 parts of naphtha were required, a total of only 1275 parts. This is less than half. This marked reduction in solvent and in precipitant by incorporating some of the rubber hydrochloride precipitant in the original solvent is an important factor both in simplicity of present process and in control of the quality of the rubber hydrohalide produced. For, action of the rubber hydrochloride can readily be stopped by adding a relatively small amount of precipitant, such as solvent naphtha and neutralization before the complete absorption of hydrogen chloride to about 33% chlorine content has been effected.

Examples I and III illustrate hydrochlorinating rubber in solution practically to maximum degree of about 33.5% chlorine; while Examples II and IV illustrate first hydrochlorinating to about 26% to 31% chlorine, and then bringing the precipitated product up to about 33.5% chlorine.

The resultant rubber hydrochloride is white in color, finely divided or powdery, and sufficiently bulky to dry very rapidly at room temperature or at slightly elevated temperatures. This product dissolves readily in chloroform, benzene, ethylene dichloride, or other solvents and may be made into films, adhesives, or coatings as desired. It is compatible with most of the usual plasticizers for plastic materials and may be used with pigments or stabilizers as desired. This finely divided form of rubber hydrochloride contrasts with flakes, lumps or honeycomb gel structure in which previous hydrochlorinated rubber products often have been obtained. This product filters easily and contains only a small amount of solvent after filtration. The small particle size makes for quicker solution of the product and for better and more even mixing with other materials; hence the finely divided product is valuable.

It will be observed that by this process the rubber hydrochloride production is completed in a relatively short time and also may be accomplished with relatively greater concentration of rubber in solution and therefore with greater productivity than heretofore.

Precipitation of the rubber hydrochloride, instead of evaporation of solvent therefrom, is an aid to obtaining a more pure product. Simple evaporation would leave various impurities in the rubber hydrochloride; whereas in the present precipitation, these impurities are retained in the liquid; such small amounts as do accompany the precipitate are easily removed by washing because of the open, finely divided nature of the precipitate.

When exceptionally dirty rubber, that is, a rubber high in proteins, waxes and other impurities, is used we may purify the rubber or the rubber hydrohalide by extraction with suitable solvents such as acetone, naphtha-alcohol mixtures, alcohol-chloroform mixtures, alcohol-ethylene dichloride mixtures, or alcohol depending upon the nature of the impurity present. These extractions may be acomplished in a short time due to the small particle size of our product.

This process avoids accumulating large amounts of dissolved hydrogen halide in the solvent.

The fluidity agent does not affect the viscosity of the rubber hydrohalide itself, as may be determined by redissolving the product. But the fluidity agent does dissolve the hydrogen halide reagent. The fluidity agent is recovered substantially unchanged and undiminished.

As aromatic hydrocarbons for solvents we employ benzene, toluene, or xylene, for example, or as chlorinated aromatic hydrocarbons we employ chlorbenzene or ortho-dichlorobenzene. As aliphatic hydrocarbons in the solvent, we employ petroleum fractions illustrated by solvent naphtha, gasoline, kerosene, or cyclohexane. More particularly, naphtha fractions with a boiling range between 140° C. and 200° C. offer advantages in distillation recovery. As chlorinated aliphatic hydrocarbons, we employ chloroform, ethylene dichloride, propylene dichloride, or carbon tetrachloride.

As fluidity agent of high solvent power for hydrogen halide may be used a substance that will lower the surface tension or lower viscosity of the rubber solution, that is miscible with the solvents used and does not react with hydrohalide in the cold and preferably in which hydrogen halide is soluble and that does not dissolve rubber nor rubber hydrohalide nor appreciably swell them. Mono-basic aliphatic acids that contain from one to five carbon atoms are suitable; for example acetic acid is particularly effective. Aliphatic alcohols that contain from one to six carbon atoms are especially advantageous under this invention as, for example, butyl alcohol. Secondary alcohols may be used where they exhibit no substantial inclination to react with hydrohalides. Tertiary alcohols are not preferred where they react with hydrogen halides. Other hydroxylated compounds are glycols and their derivatives may be used where they similarly are resistant to hydrogen halide.

The rubber suitable for use in our process includes butadiene and dimethyl butadiene and related polymers, vulcanized or unvulcanized rubber, reclaimed rubber, gutta percha, balata, synthetic rubber, and like products, either purified by suitable means or without purification. The rubber may be milled or heat treated previous to hydrohalogenation, if desired.

While in accordance with the patent statutes we have described a preferred embodiment of this invention, it will now be apparent to those skilled in the art that modifications and alterations may be made within the scope of the appended claims.

What we claim is:

1. A process of producing rubber hydrohalide comprising treating rubber in solution by introducing gaseous hydrogen halide of the group consisting of hydrogen chloride, hydrogen bromide and hydrogen iodide in the presence of butyl alcohol as relatively inert fluidity agent.

2. A process of forming rubber hydrohalide comprising treating rubber dissolved in benzene by introducing hydrogen halide of the group consisting of hydrogen chloride, hydrogen bromide and hydrogen iodide in the presence of butyl alcohol and of naphtha.

3. A process of producing rubber hydrochloride comprising treating rubber in the proportions of about 100 parts in 820 parts of benzene and 80 parts of butyl alcohol with hydrogen chloride to a chlorine content in the product of about 26 to 33.5% chlorine.

4. A process of producing rubber hydrochloride comprising treating rubber in the proportions of about 100 parts in 820 parts of benzene and 80 parts of butyl alcohol with hydrogen chloride to a chlorine content in the product of about 26 to 33.5% chlorine, the temperature during reaction being maintained at about 10 to 35° C.

5. A process of producing rubber hydrochloride comprising treating rubber in the proportions of about 100 parts in 820 parts of benzene and 80 parts of butyl alcohol with hydrogen chloride to a chlorine content in the product of about 26 to 33.5% chlorine, then adding precipitant for rubber hydrochloride, the temperature during reaction being maintained at about 10 to 35° C., the initial addition of precipitant being slow to produce gel that absorbs the precipitant instead of becoming broken and lumpy during the earlier stages of adding of precipitant.

6. A process of preparing rubber hydrohalide composition comprising treating rubber dissolved in benzene in the presence of n-butyl alcohol with gaseous hydrogen halide of the group consisting of hydrogen chloride, hydrogen bromide and hydrogen iodide, adding solvent naphtha to precipitate the rubber hydrohalide and then adding hydrogen halide to the precipitate.

7. A process of producing rubber hydrochloride comprising treating rubber in the proportions of about 100 parts dissolved in 275 parts of benzene containing also 550 parts of solvent naphtha and 37.5 parts of butyl alcohol, with hydrogen chloride to a chlorine content in the product of about 26 to 31%, the temperature during the reaction being maintained at about 10° C. to 35° C.

8. As a new composition of matter a solution of rubber hydrochloride containing about 26 to 33½% chlorine in a mixture of benzene, butyl alcohol and naphtha.

9. A process of producing rubber hydrohalide comprising reacting dissolved rubber with hydrogen halide of the group consisting of hydrogen chloride, hydrogen bromide and hydrogen iodide in solvent for rubber and rubber halide containing fluidity agent from the group consisting of aliphatic alcohols containing from 1 to 6 carbon atoms and monobasic aliphatic acids containing 1 to 5 carbon atoms until the product contains hydrohalide equivalent to about 26 to 31% chlorine, then adding precipitating agent and then adding hydrogen halide to the precipitate in the presence of the initial solvent and of precipitating agent, to increase the hydrogen halide content of the precipitate.

10. A process of producing finely divided rubber hydrochloride, comprising reacting rubber dissolved in benzene, with hydrogen chloride in the presence of butyl alcohol as fluidity agent and of solvent naphtha in insufficient amount to cause precipitation of the rubber hydrochloride until a chlorine content of 26 to 31% is attained and then precipitating the rubber hydrochloride by controlled addition of solvent naphtha.

11. A process for producing rubber hydrochloride comprising reacting dissolved rubber with gaseous hydrogen chloride in the presence of aliphatic alcohols of 1 to 6 carbon atoms as fluidity agent for the solution, until the product contains hydrochloride equivalent to about 26 to 31% chlorine, then adding precipitating agent and then adding hydrogen chloride to the precipitate in the presence of the initial solvent and precipitating agent, to increase the chlorine content of the precipitate.

12. A process of producing rubber hydrohalide comprising contacting hydrogen halide of the group consisting of hydrogen chloride, hydrogen bromide and hydrogen iodide, with a solution of rubber, the solution containing as fluidity agent inert to hydrogen halide, compound of the group consisting of aliphatic alcohols containing 1 to 6 carbon atoms, and monobasic aliphatic acids containing 1 to 5 carbon atoms.

13. A process of producing rubber hydrohalide comprising reacting rubber dissolved in benzene with hydrogen halide of the group consisting of hydrogen chloride, hydrogen bromide and hydrogen iodide, in the presence of butyl alcohol, precipitating rubber hydrohalide and subsequently reacting additional hydrogen halide with the precipitate.

14. A process of producing rubber hydrohalide comprising reacting rubber in solution in benzene with hydrogen halide of the group consisting of hydrogen chloride, hydrogen bromide and hydrogen iodide, in the presence of butyl alcohol as fluidity agent.

TROY M. ANDREWS.
HOWARD F. REEVES, Jr.